US008723950B2

(12) United States Patent
Hertel

(10) Patent No.: US 8,723,950 B2
(45) Date of Patent: May 13, 2014

(54) APPARATUS FOR EVALUATING FIT OF A MODULAR ASSEMBLY INTO A BODY OPENING AND METHOD OF USING SAME

(75) Inventor: Brian Hertel, Granger, IN (US)

(73) Assignee: Pilkington Group Limited, St. Helens (GB)

( * ) Notice: Subject to any disclaimer, the term of this patent is extended or adjusted under 35 U.S.C. 154(b) by 325 days.

(21) Appl. No.: 13/152,358

(22) Filed: Jun. 3, 2011

(65) Prior Publication Data

US 2011/0304727 A1    Dec. 15, 2011

Related U.S. Application Data

(60) Provisional application No. 61/353,701, filed on Jun. 11, 2010.

(51) Int. Cl.
*H04N 7/18* (2006.01)
*G01B 11/02* (2006.01)
*G01C 15/00* (2006.01)

(52) U.S. Cl.
CPC .............. *H04N 7/18* (2013.01); *H04N 7/181* (2013.01); *G01B 11/022* (2013.01); *G01B 11/024* (2013.01); *G01C 15/00* (2013.01)
USPC ........... 348/135; 348/136; 348/137; 348/138; 348/139; 348/140; 348/141; 348/142; 348/143; 348/144; 348/145; 348/146; 348/147; 348/148; 348/149; 348/150; 348/151; 348/152; 348/153; 348/154; 348/155; 348/156; 348/157; 348/158; 348/159; 348/160; 348/161; 702/127

(58) Field of Classification Search
CPC ..... B06J 1/005; G01B 11/022; G01B 11/024; G01C 15/00; H04N 7/18; H04N 7/181
USPC .......................................................... 348/135
See application file for complete search history.

(56) References Cited

U.S. PATENT DOCUMENTS

| 1,912,545 | A | * | 6/1933 | Smith | 446/439 |
|---|---|---|---|---|---|
| 2,755,095 | A | * | 7/1956 | Douglas et al. | 280/1.12 |
| 3,400,971 | A | * | 9/1968 | Rentz | 296/201 |
| 4,332,413 | A | * | 6/1982 | Erion | 296/201 |
| 4,364,595 | A | * | 12/1982 | Morgan et al. | 296/96.11 |
| 4,561,625 | A | * | 12/1985 | Weaver | 249/85 |
| 4,700,525 | A | * | 10/1987 | Nieboer et al. | 52/698 |
| 4,909,869 | A | * | 3/1990 | Sakamoto et al. | 156/64 |
| 5,263,759 | A | * | 11/1993 | Brodie et al. | 296/84.1 |
| 5,477,268 | A | * | 12/1995 | Shimbara et al. | 348/128 |

(Continued)

FOREIGN PATENT DOCUMENTS

| EP | 0046360 | 2/1982 |
|---|---|---|
| EP | 1369340 | 12/2003 |

(Continued)

*Primary Examiner* — Andy Rao
*Assistant Examiner* — Shan Elahi
(74) *Attorney, Agent, or Firm* — Marshall & Melhorn, LLC

(57) ABSTRACT

An apparatus for evaluating the fit of a modular window assembly into a simulated vehicle body opening includes a base member, a vehicle body opening/sheet metal simulator mounted to the base member, one or more light sources disposed in the vehicle body opening/sheet metal simulator and one or more devices for securing the vehicle window to the vehicle body opening/sheet metal simulator. A method of utilizing the apparatus is also a part of the invention.

9 Claims, 4 Drawing Sheets

(56) References Cited

U.S. PATENT DOCUMENTS

| | | | | |
|---|---|---|---|---|
| 5,635,281 | A * | 6/1997 | Agrawal | 428/192 |
| 5,839,231 | A * | 11/1998 | Gebhart et al. | 49/413 |
| 5,864,996 | A * | 2/1999 | Veldman et al. | 52/204.597 |
| 6,252,254 | B1 * | 6/2001 | Soules et al. | 257/89 |
| 6,871,450 | B2 * | 3/2005 | Repp et al. | 49/398 |
| 7,023,358 | B2 * | 4/2006 | Kohlstrand | 340/870.07 |
| 7,195,381 | B2 * | 3/2007 | Lynam et al. | 362/494 |
| 7,307,675 | B2 | 12/2007 | Abileah | |
| 7,469,450 | B2 * | 12/2008 | Gipson | 16/382 |
| 7,641,268 | B2 * | 1/2010 | Goffart et al. | 296/193.11 |
| 8,062,763 | B2 * | 11/2011 | Ewolski et al. | 428/582 |
| 8,091,948 | B2 * | 1/2012 | Smith et al. | 296/146.16 |
| 2001/0039991 | A1 * | 11/2001 | Swanson et al. | 156/108 |
| 2002/0159270 | A1 * | 10/2002 | Lynam et al. | 362/492 |
| 2003/0067773 | A1 * | 4/2003 | Marshall et al. | 362/231 |
| 2003/0098797 | A1 * | 5/2003 | Kohlstrand | 340/665 |
| 2005/0061484 | A1 * | 3/2005 | Hendricks et al. | 165/104.21 |
| 2008/0232126 | A1 * | 9/2008 | Goffart et al. | 362/507 |
| 2008/0232609 | A1 * | 9/2008 | Snider | 381/86 |
| 2009/0267382 | A1 * | 10/2009 | Smith et al. | 296/146.15 |
| 2010/0279255 | A1 * | 11/2010 | Williams, II | 434/29 |

FOREIGN PATENT DOCUMENTS

| | | |
|---|---|---|
| EP | 1369340 A2 * | 12/2003 |
| EP | 1972529 | 9/2008 |
| FR | 2786735 | 6/2000 |

* cited by examiner

US 8,723,950 B2

APPARATUS FOR EVALUATING FIT OF A MODULAR ASSEMBLY INTO A BODY OPENING AND METHOD OF USING SAME

RELATED APPLICATION

This application is claiming the benefit, under 35 U.S.C. 119(e), of the provisional application filed Jun. 11, 2010 under 35 U.S.C. 111(b), which was granted Ser. No. 61/353,701. This provisional application is hereby incorporated by reference.

BACKGROUND OF THE INVENTION

The present invention relates to an apparatus precisely simulating an opening in a vehicle body to receive a vehicle window, so that when a vehicle window is placed in the simulated body opening the accuracy of the fit between the periphery of the vehicle window and vehicle body opening can be determined.

More particularly, the present invention relates to an apparatus precisely dimensionally simulating an opening in a vehicle body, so that when a modular vehicle window assembly is placed on the apparatus, lighting on the apparatus assists in determining the accuracy of the fit between the periphery of the modular vehicle window and the simulated vehicle body opening.

While certain pre-production testing of the various components which make up a vehicle has long been conducted, many vehicle manufacturers have increased such pre-production testing to minimize costly problems on the vehicle assembly line. Additionally, overall quality of fit and finish has received an increased level of attention by vehicle manufacturers. Accordingly, vehicle manufacturers have increased expectations of their suppliers to provide a high quality product that can be readily integrated into the vehicle during the assembly process.

The detection of any issues in the integration of a component into the vehicle should occur at the earliest possible time, and with a view to repeatability and ease of detection. The inventors hereof have sought to achieve these objectives in connection with the fit of a modular vehicle window assembly into its intended opening in a vehicle body opening, particularly utilizing certain lighting techniques.

Concern with the accuracy of the fit of a window into a vehicle body opening is described in the patent literature, for example:

U.S. Pat. No. 4,909,869 describes a method of mounting a window glass on a vehicle body comprising attaching a positioning member for defining the position of the window glass relative to a window frame portion of the vehicle body in such a manner that a difference in brightness of color perceptible for an image sensor is made between the window frame portion and at least a part of the positioning member, detecting a location of the positioning member on the window frame portion by means of the image sensor, and fitting the window glass to the window frame portion by means of a robot operative to move along a working path which is modified in response to a detection output of the image sensor.

U.S. Pat. No. 7,023,358 describes a method and an assembly for identifying the existence and the size of a gap. In one embodiment, the assembly includes a strain gauge as two members abuttingly engage. The force is said to be representative of the amount of space between the two members or portions thereof, and this information is wirelessly transmitted to a receiver and display assembly.

SUMMARY OF THE INVENTION

The present invention relates to an apparatus for evaluating the fit of a modular vehicle window assembly into a simulated vehicle body opening and a method for using the apparatus.

For purposes of this application, a "modular vehicle window" assembly means a vehicle window having a molded-on polymeric component around at least a portion of its periphery and perhaps items of hardware or other useful components incorporated therewith. A "vehicle body opening" means a space having a predetermined size and shape peripherally defined by the sheet metal of the vehicle body, for example vehicle body openings for windshields, backlights and sidelights.

The apparatus of the invention includes a supporting base member to which is mounted a vehicle body opening/sheet metal simulator, which to a high degree of precision, dimensionally represents the vehicle body opening in an actual vehicle in the vehicle assembly process. Likewise, the modular vehicle window assembly is to be representative of actual production window assemblies.

While it is possible to identify gross discrepancies in fit between the vehicle body opening and the modular vehicle window assembly by the unaided visual observation of a modular vehicle window assembly placed into a recessed cavity preferably forming a portion of the vehicle body opening/sheet metal simulator, it is very difficult to discern more subtle, but still potentially troublesome discrepancies by such method. The inventors have found that by providing at least one, but preferably a plurality of light sources in light transmitting openings formed in predetermined locations in a recessed cavity portion of the vehicle body opening/sheet metal simulator it is possible to greatly enhance the visibility of "gaps" between the peripheral edges of the modular vehicle window assembly and the vehicle body opening in which it is to be installed. Once identified, steps can be taken by the vehicle manufacturer, the modular vehicle window assembly supplier, or both, to eliminate or minimize to acceptable levels, such gaps in the actual vehicle assembly process. Preferably, high intensity lighting sources are utilized for this purpose.

As it is desirable to conduct the above-described evaluation of fit in an orientation similar to the orientation of the vehicle body opening in the actual vehicle, the base support member on which the vehicle body opening/sheet metal simulator is mounted is preferably capable of being disposed at various angles between horizontal and vertical. In order to ensure that the modular vehicle window assembly remains precisely positioned in the vehicle body opening/sheet metal simulator suitable clamping devices are preferably utilized.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

The present invention relates to an apparatus for evaluating the fit of a modular vehicle window assembly into a simulated vehicle body opening and a method for using the apparatus.

Generally, the apparatus of the invention includes a supporting base member to which is mounted a vehicle body opening/sheet metal simulator which, to a high degree of precision, dimensionally represents the vehicle body opening in an actual vehicle in the vehicle assembly process. Similarly, the modular vehicle window assembly to be evaluated is to be representative of actual production window assemblies.

Figure 1:
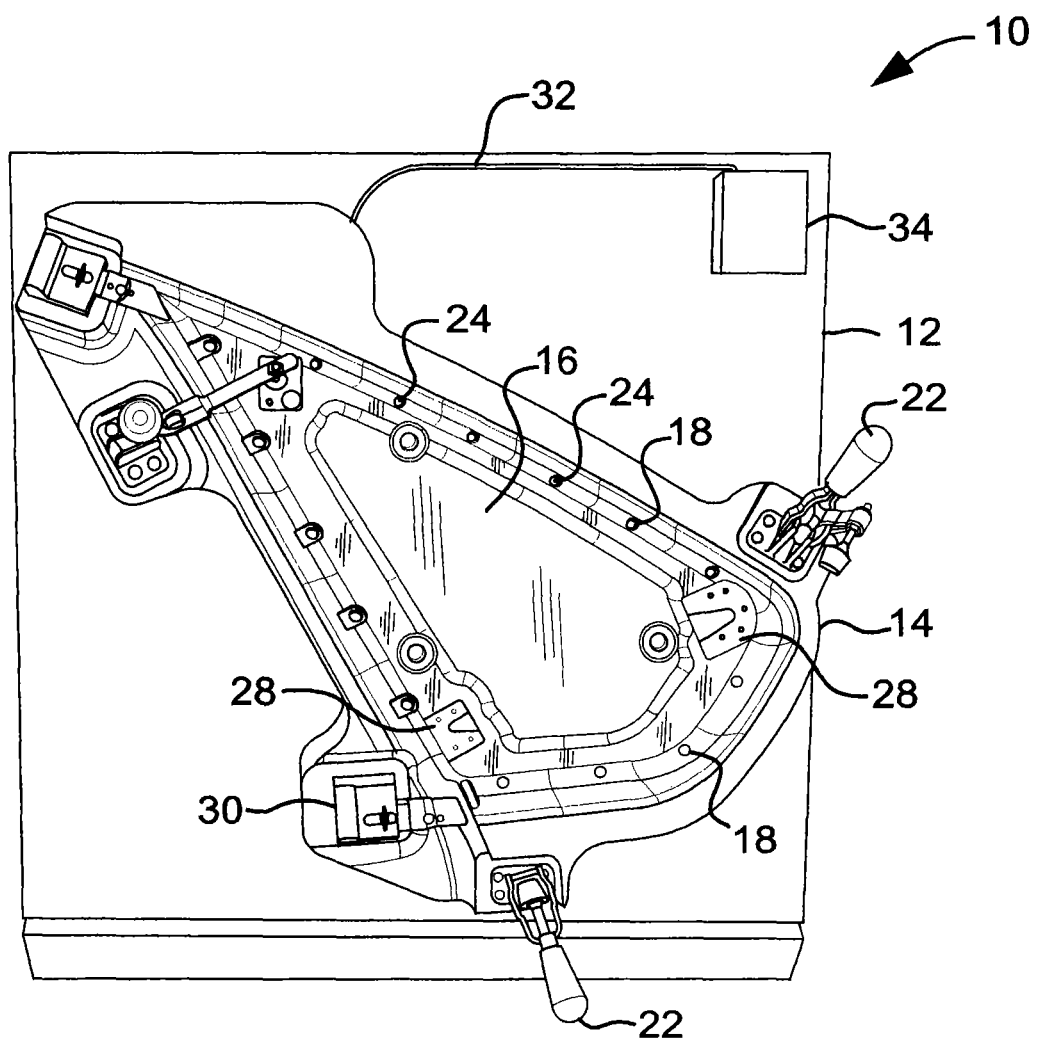
FIG. 1 shows a perspective view of the front side of the apparatus according to the present invention.

Referring to FIG. 1, the apparatus 10 of the invention includes a supporting base member 12, which is preferably adjustable in orientation between 0° (horizontal) and 90% (vertical) so as to simulate the orientation of the vehicle window assembly 20 in the actual vehicle. Simulating the installation angle of the window assembly 20 provides for a more accurate evaluation. The supporting base member 12 can be of any desired shape and dimensions and can be made of any suitable material, the material preferably being dimensionally stable.

According to the invention, a vehicle body opening/sheet metal simulator 14 is mounted to the supporting base member 12 by any suitable method. The vehicle body opening/sheet metal simulator 14 may be formed from a block of material in which various features may be formed by any suitable method. Various components may also be assembled to form the simulator. For example, a recessed cavity 16 may be precisely machined into a block of a suitable dimensionally stable material. Such suitable materials may include steel, aluminum, and carbon fiber, as examples.

A feature of the recessed cavity 16 includes at least one light transmitting opening 18. Preferably, a plurality of light transmitting openings 18 are located around the periphery of the recessed cavity 16 so as to provide a uniform level of illumination, for example at least 20 lumens per light source 24, sometimes referred to as backlighting, around such periphery. Each light transmitting opening 18 is capable of accommodating at least one light source 24, preferably a high intensity light source, more preferably, an LED light. Each light source 24 is attached to a suitable source of electric power. LED lights are particularly compatible with DC electric power for use with the apparatus 10 of the invention. Portability of the apparatus 10 is greatly enhanced with the use of battery-supplied DC power. The low heat output of LED lights is also a desirable feature in the context of the present invention.

At least one vehicle window clamping mechanism 22 is, preferably, a component of the apparatus 10 of the invention.

As previously noted, it is desirable to evaluate the fit of the modular vehicle window assembly 20 in the recessed cavity 16 of the vehicle body opening/sheet metal simulator 14 at the same angle as the installation angle of the window assembly 20 in the actual vehicle. Since this preferred orientation is normally much nearer to vertical than to horizontal, it is advantageous to incorporate one or more clamping mechanisms 22 into the apparatus 10 of the invention to retain the modular window assembly 20 in its proper position in the recessed cavity 16 of the vehicle body opening/sheet metal simulator 14 before and during the fit evaluation process. Improper positioning of the window assembly 20 in the simulator 14 could result in an inaccurate fit evaluation. Preferred clamping mechanisms 22 are, for example, those commercially available from De-Sta-Co or any manually actuated hand clamp.

FIG. 1 shows an exemplary apparatus according to the invention including a supporting base member 12 to which is attached a vehicle body opening/sheet metal simulator 14 suitable for evaluating the fit of a modular vehicle window assembly 20 in the recessed cavity 16 formed in the vehicle body opening/sheet metal simulator 14. In this exemplary apparatus, a plurality of light transmitting openings 18 have been formed at advantageous locations around the periphery of the recessed cavity 16. A light source 24, particularly an LED light source is disposed in each of the light transmitting openings 18. A clamping pad 28 may be disposed in the recessed cavity 16 proximate locations where a clamping mechanism 22 engages a modular vehicle window assembly 20 positioned in the recessed cavity 16 of the apparatus 10. Clamping mechanisms 22 of the manually actuated hand-type clamp are mounted on the apparatus 10 and when engaged with the positioned modular vehicle window 20 in the recessed cavity 16, positively restrain the window assembly 20 precisely therein to facilitate an accurate evaluation of the fit of the window assembly 20 in the simulated vehicle body opening 14.

Electrical connectors 30, wiring 32, and at least one switch 34 to activate/deactivate the lights are also typically, utilized for the operation of the apparatus 10, but are not a part of the invention.

Figure 2:
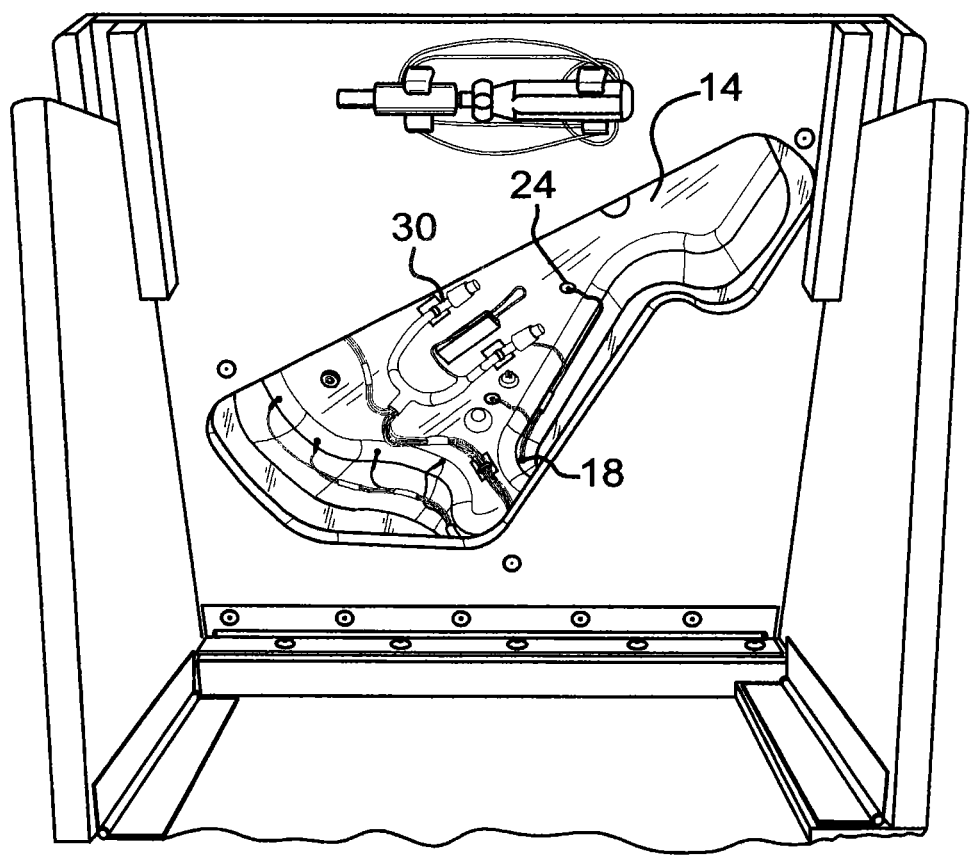
FIG. 2 shows a perspective view of the rear side of the apparatus of FIG. 1, including electrical wiring, etc.

FIG. 2 shows the reverse side of the apparatus 10 of the invention as shown in FIG. 1, providing a view of the disposition of the light sources 24 in the plurality of light transmitting openings 18 formed in the vehicle body opening/sheet metal simulator 14, and a typical means of connecting same to a source of electrical power either AC or DC, as discussed in more detail elsewhere herein.

Figure 3:
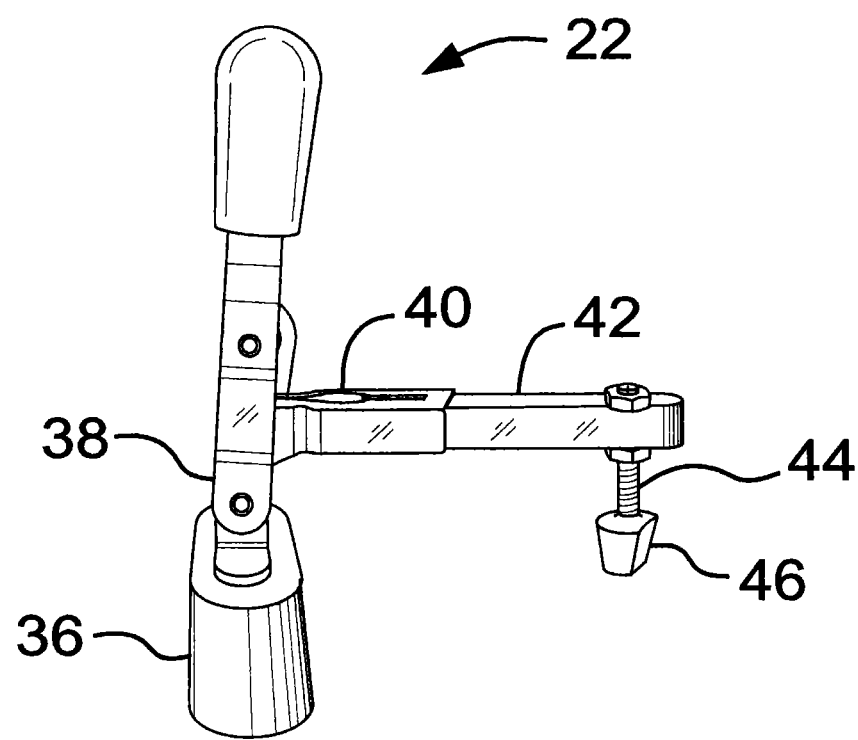
FIG. 3 shows an enlarged view illustrating one of the preferred clamping devices of the invention.

FIG. 3 shows a close up view of a preferred clamping mechanism 22 according to the invention. Such preferred clamping mechanism 22 can be seen to comprise a base member 36, an attachment bracket 38 attached to the base member 36, a lever arm 40 movably attached to the attachment bracket 38, a clamping arm 42 attached to the lever arm 40, and an adjustable contact rod 44 attached to the clamping arm 42. A pressure distribution device 46 may be attached to the distal end of the contact rod 44 where it contacts a portion of the modular vehicle window assembly 20 positioned in the recessed cavity 16 of the vehicle body opening/sheet metal simulator 14.

Figure 4:
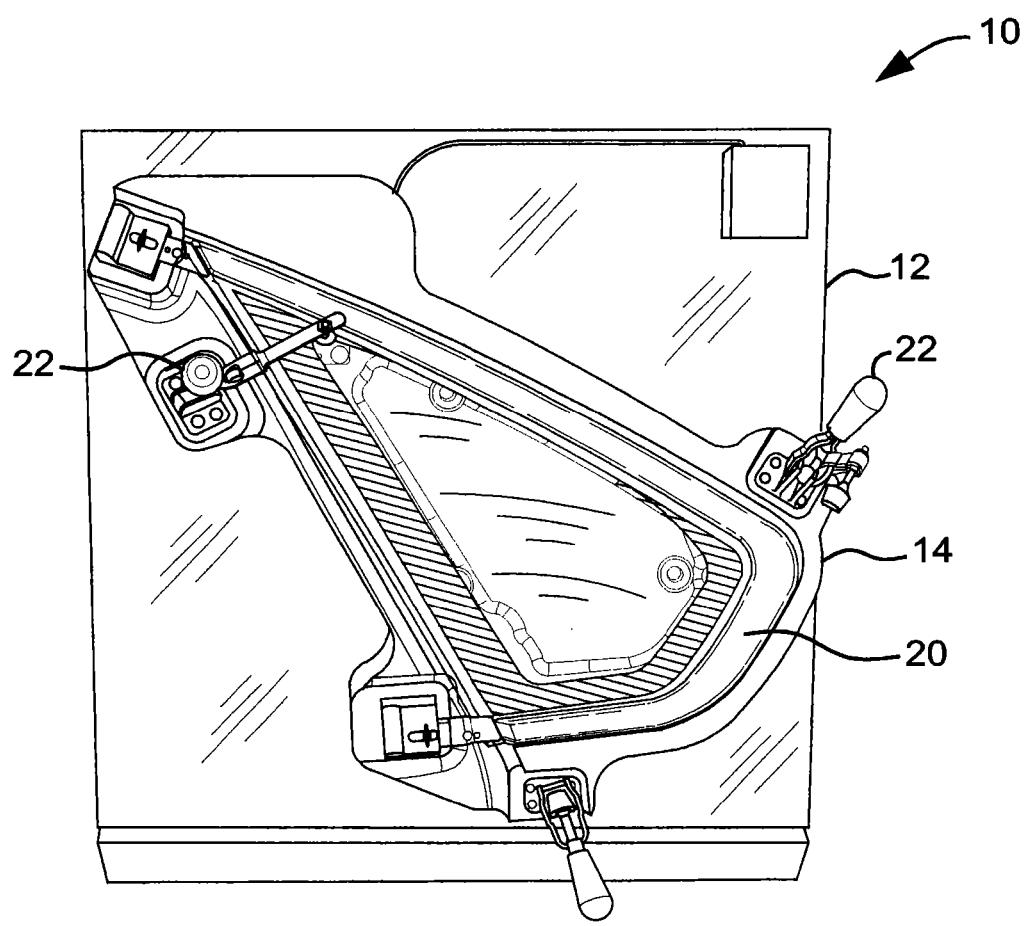
FIG. 4 shows a perspective view of the apparatus according to the invention with a modular vehicle window assembly disposed on the apparatus.

FIG. 4 shows the apparatus 10 of the invention having a modular vehicle window assembly 20 disposed on the apparatus 10, particularly, in position for evaluation of the fit of the vehicle window assembly 20 relative to vehicle body opening/sheet metal simulator 14, and being held in place by at least one clamping mechanism 22.

A method of utilizing the previously described apparatus 10 to evaluate the fit of a modular window assembly 20 into a simulated vehicle body opening 14 is also within the scope of the invention.

In the method of the invention, a production-ready modular window assembly 20 is precisely positioned in the recessed cavity 16 of the vehicle body opening/sheet metal simulator 14, the shape of which cavity 16 should closely correspond to the shape of the vehicle body opening being simulated. The correspondence between the dimensions of the vehicle body opening/sheet metal simulator 14 is preferably + or −0.2 mm. The one or more clamping mechanisms 22 are operated to actively restrain the modular window assembly 20 in position in the recessed cavity 16 of the apparatus 10. The at least one light source 24 is illuminated so as to shine through the at least one light transmitting opening 18 so as to illuminate some or all of the recessed cavity of the vehicle body opening/sheet metal simulator 14, and some or all of the first major surface 26 of the positioned vehicle window assembly 20. Light thus created will shine through any gaps between the periphery of the recessed cavity 16 and the periphery of the vehicle window assembly 20. Gaps so detected may represent potential defects requiring corrective action on the part of the supplier of the vehicle window assembly 20, on the part of the vehicle manufacturer, or by both parties. In any event, such areas requiring corrective action are preferably identified before such issues of fit and finish adversely affect vehicle assembly on the production line. It is envisioned that the apparatus 10 and the method of the invention may be utilized as a quality check, sometimes referred to as a checking fixture, during production to minimize issues which may arise during ongoing vehicle assembly operations.

As so far described, the fit evaluation process of the invention is, primarily, qualitative in nature. Enhancing the invention by incorporating a camera or other device capable of capturing an electronic image, for example, a digital image, of the fit of the vehicle window assembly 20 into the recessed cavity 16, and transmitting same to a computer where such digital image is analyzed and quantitative results produced regarding the fit of the vehicle window 20 in the recessed cavity 16, is within the scope of the invention.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are with the scope of the invention as determined by the appended claims when interpreted in accordance with the breadth to which they are fairly, legally and equitably entitled.

What is claimed:

1. An apparatus for evaluating the fit of a modular window assembly into a simulated vehicle body opening comprising:
   a supporting base member;
   a vehicle body opening simulator mounted to the base member;
   one or more light sources disposed in the vehicle body opening simulator for illuminating a vehicle window positioned proximate the simulator; and
   one or more vehicle window clamping mechanism capable of securing the vehicle window to the vehicle body opening simulator.

2. The apparatus defined in claim 1, wherein the vehicle body opening simulator comprises a metal material.

3. The apparatus defined in claim 2, wherein the one or more light sources comprise LED lights.

4. The apparatus defined in claim 3, wherein the one or more light sources is capable of emitting at least 20 lumens per light source.

5. An apparatus for evaluating the fit of a modular window assembly into a simulated vehicle body opening comprising:
   a supporting base member;
   a vehicle body opening simulator mounted to the base member, the vehicle body opening simulator comprising:
   a recessed cavity having the precise shape of the periphery of a vehicle body opening;
   at least one light transmitting opening formed in the cavity;
   at least one light source disposed so as to provide light through the at least one light transmitting opening, the at least one light source being attached to a source of electric power; and
   at least one vehicle window clamping mechanism attached to the vehicle body opening simulator.

6. The apparatus defined in claim 5, wherein the dimensions of the recessed cavity of the vehicle body opening simulator are within +or −0.2 mm of the dimensions of the actual vehicle body opening being simulated.

7. A method of evaluating the fit of a modular window assembly into a simulated vehicle window body opening comprising:
   providing a vehicle body opening simulator;
   securing a vehicle window to the vehicle body opening simulator;
   backlighting the vehicle window; and
   evaluating the fit of the vehicle window relative to the vehicle body opening simulator.

8. A method of evaluating the fit of a modular window assembly into a simulated vehicle window body opening comprising:
   providing a supporting base member;
   providing a vehicle body opening simulator mounted to the base member comprising:
   a recessed cavity having the precise shape of the periphery of a vehicle body opening;
   at least one light transmitting opening formed in the recessed cavity;
   at least one light source disposed in the at least one light transmitting opening, the at least one light source being connected to a source of electric power; and
   at least one vehicle window clamping mechanism attached to the vehicle body opening simulator;
   positioning a vehicle window assembly in the recessed cavity of the vehicle body opening simulator, the vehicle window assembly having a first major surface facing toward the recessed cavity and a second major surface facing away from the recessed cavity;
   operating the at least one vehicle window clamping mechanism to positively restrain the vehicle window assembly in the vehicle body opening simulator;
   activating the at least one light source to shine through the light transmitting opening, to illuminate the recessed cavity and the first major surface of the positioned vehicle window assembly, thus exposing any gaps between the periphery of the recessed cavity and the periphery of the vehicle window assembly; and
   evaluating the fit of the vehicle window assembly relative to the periphery of the recessed cavity of the vehicle body opening simulator by visual observation of the gaps exposed by the illumination of the recessed cavity and the first major surface of the positioned vehicle window assembly.

9. The method defined in claim 8, further comprising recording an electronic image of the fit of the vehicle window assembly relative to the periphery of the recessed cavity of the vehicle body opening simulator with an image capture device and transmitting the electronic image to a computer for quantitative analysis thereof.

* * * * *